United States Patent
Drennan

(10) Patent No.: US 9,294,874 B2
(45) Date of Patent: *Mar. 22, 2016

(54) WIRELESS USER BASED NOTIFICATION SYSTEM

(71) Applicant: Unwired Planet, LLC, Reno, NV (US)

(72) Inventor: Mark Drennan, Fort Collins, CO (US)

(73) Assignee: Unwired Planet, LLC, Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 14/337,081

(22) Filed: Jul. 21, 2014

(65) Prior Publication Data

US 2014/0329506 A1 Nov. 6, 2014

Related U.S. Application Data

(63) Continuation of application No. 13/918,819, filed on Jun. 14, 2013, which is a continuation of application No. 13/593,436, filed on Aug. 23, 2012, now Pat. No. 8,494,489, which is a continuation of application No.

(Continued)

(51) Int. Cl.
*H04W 24/00* (2009.01)
*H04W 4/02* (2009.01)
(Continued)

(52) U.S. Cl.
CPC ............ *H04W 4/02* (2013.01); *H04L 12/189* (2013.01); *H04W 4/22* (2013.01); *H04W 60/005* (2013.01);
(Continued)

(58) Field of Classification Search
CPC .......... H04W 4/02; H04W 4/12; H04W 4/06; H04W 60/005; H04W 60/02; H04W 64/00

USPC .......... 455/412.1, 414.1, 414.2, 456.1, 456.2, 455/456.3, 456.4, 456.5, 456.6, 404.1, 455/404.2, 432.3, 567

See application file for complete search history.

(56) References Cited

U.S. PATENT DOCUMENTS 3,663,762 A 5/1972 Joel, Jr.
5,742,509 A 4/1998 Goldberg et al.
(Continued)

FOREIGN PATENT DOCUMENTS

AU 3309699 9/2000
EP 1209886 5/2002
(Continued)

OTHER PUBLICATIONS

3GPP Organizational Partners, "3rd Generation Partnership Project; Technical Specification Group Services and System Aspects; Functional Stage 2 Description of LCS," 3GPP Technical Specification 3G TS 23.271, Version 1.0.0, Sep. 2000.

(Continued)

*Primary Examiner* — Jean Gelin
(74) *Attorney, Agent, or Firm* — Sheppard, Mullin, Richter & Hampton LLP

(57) ABSTRACT

A group of wireless device users are notified of an event. A location data determination algorithm is provided to a wireless device, where the algorithm determines a frequency at which the device interacts with network elements to determine its location. The location data is stored in a notification server and used to identify a user at a specific location. When a governmental or commercial entity wishes to issue a notification, a message is provided to those users whose location is identified as being in an area defined by the entity.

21 Claims, 7 Drawing Sheets

Related U.S. Application Data

13/153,204, filed on Jun. 3, 2011, now Pat. No. 8,275,359, which is a continuation of application No. 11/764,071, filed on Jun. 15, 2007, now Pat. No. 7,966,020.

(60) Provisional application No. 60/814,254, filed on Jun. 16, 2006.

(51) Int. Cl.
*H04L 12/18* (2006.01)
*H04W 64/00* (2009.01)
*H04W 68/00* (2009.01)
*H04W 60/00* (2009.01)
*H04W 60/02* (2009.01)
*H04W 4/22* (2009.01)
*H04W 4/06* (2009.01)

(52) U.S. Cl.
CPC .............. *H04W 60/02* (2013.01); *H04W 64/00* (2013.01); *H04W 68/00* (2013.01); *H04W 68/005* (2013.01); *H04W 4/06* (2013.01)

(56) References Cited

U.S. PATENT DOCUMENTS

| | | | |
|---|---|---|---|
| 5,910,763 | A | 6/1999 | Flanagan |
| 6,169,476 | B1 | 1/2001 | Flanagan |
| 6,199,045 | B1 | 3/2001 | Giniger et al. |
| 6,344,794 | B1 | 2/2002 | Ulrich et al. |
| 6,438,370 | B1 | 8/2002 | Einola et al. |
| 6,552,682 | B1 | 4/2003 | Fan |
| 6,650,902 | B1 | 11/2003 | Richton |
| 6,665,541 | B1 | 12/2003 | Krasner et al. |
| 6,708,112 | B1 | 3/2004 | Beesley et al. |
| 6,745,021 | B1 | 6/2004 | Stevens |
| 6,937,867 | B2 | 8/2005 | Oda et al. |
| 7,583,197 | B2 | 9/2009 | Wesby van Swaay |
| 7,764,185 | B1 | 7/2010 | Manz et al. |
| 8,073,422 | B2 | 12/2011 | Langsenkamp et al. |
| 8,112,100 | B2 | 2/2012 | Frank et al. |
| 2003/0007464 | A1 | 1/2003 | Balani |
| 2003/0045303 | A1 | 3/2003 | Oda et al. |
| 2003/0148771 | A1 | 8/2003 | de Verteuil |
| 2004/0113768 | A1 | 6/2004 | Rodgers |
| 2004/0180645 | A1 | 9/2004 | Bussan et al. |
| 2004/0203903 | A1 | 10/2004 | Wilson et al. |
| 2005/0070247 | A1 | 3/2005 | Larson et al. |
| 2005/0151686 | A1 | 7/2005 | Ali et al. |
| 2006/0015254 | A1 | 1/2006 | Smith |
| 2006/0025158 | A1 | 2/2006 | Leblanc et al. |
| 2006/0083243 | A1 | 4/2006 | Igarashi et al. |
| 2006/0223492 | A1 | 10/2006 | Chin et al. |
| 2006/0284765 | A1 | 12/2006 | Bernhardt et al. |
| 2007/0026871 | A1 | 2/2007 | Wager |
| 2007/0167174 | A1* | 7/2007 | Halcrow et al. ............ 455/456.2 |
| 2007/0224990 | A1 | 9/2007 | Edge et al. |
| 2007/0265872 | A1 | 11/2007 | Robinson et al. |
| 2007/0281689 | A1 | 12/2007 | Altman et al. |
| 2008/0188221 | A1 | 8/2008 | Hashimoto et al. |
| 2008/0228600 | A1 | 9/2008 | Treyz et al. |
| 2009/0137255 | A1 | 5/2009 | Ashley et al. |
| 2009/0286536 | A1 | 11/2009 | Shim |
| 2010/0217663 | A1 | 8/2010 | Ramer et al. |
| 2010/0227594 | A1 | 9/2010 | De Vries |
| 2010/0269059 | A1 | 10/2010 | Othmer et al. |
| 2011/0227724 | A1 | 9/2011 | Zhao et al. |
| 2013/0246210 | A1* | 9/2013 | Blumberg et al. ........... 705/26.3 |

FOREIGN PATENT DOCUMENTS

| | | |
|---|---|---|
| EP | 1354305 | 7/2002 |
| JP | 2003070051 | 3/2003 |
| WO | 02058021 | 7/2002 |
| WO | 2006020586 | 2/2006 |
| ZA | 200200419 | 7/2002 |

OTHER PUBLICATIONS

Berners-Lee, T. et al., "Uniform Resource Identifier (URI): Generic Syntax," Network Working Group, Request for Comments: 3986, Jan. 2005.

Cell Broadcast Forum, "Advantages and Services Using Cell Broadcast," Document No. CBF-PUB(02)3R2.1, Feb. 2002.

European Telecommunications Standards Institute (ETSI), "Digital Cellular Telecommunications System (Phase 2+); Location Services (LCS); Mobile Station (MS)—Serving Mobile Location Centre (SMLC) Radio Resource LCS Protocol (RRLP) (3GPP TS 04.31 version 8.10.0 Release1999)," Technical Specification ETSI TS 101 527, V8.10.0, Jul. 25, 2002.

European Telecommunications Standards Institute, "European Digital Cellular Telecommunication System (Phase 1); Location Registration Procedures," ETSI Technical Specification GSM 03.12, Version 3.3.0 (Release 92, Phase 1), Feb. 1992.

European Telecommunications Standards Institute, "European Digital Cellular Telecommunication System (Phase 1); Network Architecture," ETSI Technical Specification GSM 03.02, Version 3.1.4 (Release 92, Phase 1), Feb. 1992.

European Telecommunications Standards Institute, "Numbering, Addressing and Identification," ETSI Technical Specification GSM 03.03, Version 3.6.0, Oct. 1993.

European Telecommunications Standards Institute, "Digital Cellular Telecommunications System (Phase 2+); Technical Realization of Short Message Service Cell Broadcast (SMSCB)," ETSI Technical Specification GSM 03.41, Version 5.0.0, Dec. 1995.

European Telecommunications Standards Institute, "Digital Cellular Telecommunications System (Phase 2+); Location Services (LCS); (Functional Description)—Stage 2," ETSI Technical Specification GSM 03.71, Version 7.0.0, Aug. 1998.

Federal Communications Commission, "Report and Order and Further Notice of Proposed Rulemaking (FCC 96-264)," In the Matter of Revision of the Commission's Rules to Ensure Compatability with Enhanced 911 Emergency Calling Systems, Proceeding No. RM-8143, Jul. 26, 1996.

Federal Communications Commission, "Third Report and Order (FCC 99-245)," In the Matter of Revision of the Commission's Rules to Ensure Compatability with Enhanced 911 Emergency Calling Systems, Proceeding No. RM-8143, Oct. 6, 1999.

Manz, Paul C. et al., U.S. Appl. No. 60/764,384, filed Jan. 26, 2006.

Munson, Jonathan P. et al., "Location-Based Notification as a General-Purpose Service," Proceedings of the 2nd International Workshop on Mobile Commerce, pp. 40-44, Sep. 28, 2002.

Petition for Inter Partes Review of U.S. Pat. No. 8,275,359, Square, Inc. (Petitioner) v. Unwired Planet LLC (Patent Owner), Jul. 14, 2014.

Petition for Inter Partes Review of U.S. Pat. No. 8,275,359: Exhibit 1011—*Declaration of James A. Proctor Jr., Square, Inc.* (Petitioner) v. *Unwired Planet LLC* (Patent Owner), Jul. 14, 2014.

Petition for Inter Partes Review of U.S. Pat. No. 8,275,359: Exhibit 1012—*Curriculum Vitae of James A. Proctor Jr., Square, Inc.* (Petitioner) v. *Unwired Planet LLC* (Patent Owner), Jul. 14, 2014.

Rahnema, Moe, "Overview of the GSM System and Protocol Architecture," IEEE Communications Magazine, Apr. 1993, pp. 92-100.

Reed, Jeffrey H. et al., "An Overview of the Challenges and Progress in Meeting the E-911 Requirement for Location Service," IEEE Communications Magazine, Apr. 1998, pp. 30-37.

United States District Court, District of Nevada, "Declaration of Sandeep Chatterjee, Ph.D. in Support of Plaintiff Unwired Planet's Proposed Claim Construction," *Unwired Planet LLC* vs. *Square, Inc.*, Case No. 3:13-CV-00579-RCJ-WGC, Jun. 16, 2014.

United States District Court, District of Nevada, "Initial Disclosure of Non-Infringement, Invalidity, and Unenforceability Contentions," *Unwired Planet LLC* vs. *Square, Inc.*, Case No. 3:13-CV-00579-RCJ-WGC, Apr. 22, 2014.

United States District Court, District of Nevada, "Initial Disclosure of Non-Infringement, Invalidity, and Unenforceability Contentions:

(56) References Cited

OTHER PUBLICATIONS

Exhibit G-1 (Square, Inc.'s characterization of U.S. Patent Application Publication No. 2007/0281689 on U.S. Pat. No. 8,275,359)," *Unwired Planet LLC* vs. *Square, Inc.*, Case No. 3:13-CV-00579-RCJ-WGC, Apr. 22, 2014.

United States District Court, District of Nevada, "Initial Disclosure of Non-Infringement, Invalidity, and Unenforceability Contentions: Exhibit G-2 (Square, Inc.'s characterization of U.S. Pat. No. 8,073,422 on U.S. Pat. No. 8,275,359)," *Unwired Planet LLC* vs. *Square, Inc.*, Case No. 3:13-CV-00579-RCJ-WGC, Apr. 22, 2014.

United States District Court, District of Nevada, "Initial Disclosure of Non-Infringement, Invalidity, and Unenforceability Contentions: Exhibit G-3 (Square, Inc.'s characterization of U.S. Patent Application Publication No. 2010/0269059 on U.S. Pat. No. 8,275,359)," *Unwired Planet LLC* vs. *Square, Inc.*, Case No. 3:13-CV-00579-RCJ-WGC, Apr. 22, 2014.

United States District Court, District of Nevada, "Initial Disclosure of Non-Infringement, Invalidity, and Unenforceability Contentions: Exhibit G-4 (Square, Inc.'s characterization of U.S. Pat. No. 7,764,185 on U.S. Pat. No. 8,275,359)," *Unwired Planet LLC* vs. *Square, Inc.*, Case No. 3:13-CV-00579-RCJ-WGC, Apr. 22, 2014.

United States District Court, District of Nevada, "Initial Disclosure of Non-Infringement, Invalidity, and Unenforceability Contentions: Exhibit G-5 (Square, Inc.'s characterization of U.S. Patent Application Publication No. 2006/0223492 on U.S. Pat. No. 8,275,359)," *Unwired Planet LLC* vs. *Square, Inc.*, Case No. 3:13-CV-00579-RCJ-WGC, Apr. 22, 2014.

United States District Court, District of Nevada, "Initial Disclosure of Non-Infringement, Invalidity, and Unenforceability Contentions: Exhibit G-6 (Square, Inc.'s characterization of U.S. Pat. No. 6,650,902 on U.S. Pat. No. 8,275,359)," *Unwired Planet LLC* vs. *Square, Inc.*, Case No. 3:13-CV-00579-RCJ-WGC, Apr. 22, 2014.

United States District Court, District of Nevada, "Initial Disclosure of Non-Infringement, Invalidity, and Unenforceability Contentions: Exhibit G-7 (Square, Inc.'s characterization of U.S. Pat. No. 6,552,682 on U.S. Pat. No. 8,275,359)," *Unwired Planet LLC* vs. *Square, Inc.*, Case No. 3:13-CV-00579-RCJ-WGC, Apr. 22, 2014.

United States District Court, District of Nevada, "Initial Disclosure of Non-Infringement, Invalidity, and Unenforceability Contentions: Exhibit G-8 (Square, Inc.'s characterization of U.S. Pat. No. 6,199,045 on U.S. Pat. No. 8,275,359)," *Unwired Planet LLC* vs. *Square, Inc.*, Case No. 3:13-CV-00579-RCJ-WGC, Apr. 22, 2014.

United States District Court, District of Nevada, "Initial Disclosure of Non-Infringement, Invalidity, and Unenforceability Contentions: Exhibit G-9 (Square, Inc.'s characterization of Munson et al., "Location-Based Notification as a General-Purpose Service," on U.S. Pat. No. 8,275,359)," *Unwired Planet LLC* vs. *Square, Inc.*, Case No. 3:13-CV-00579-RCJ-WGC, Apr. 22, 2014.

Wang, S.S. et al., "E-911 Location Standards and Location Commercial Services," Proceedings of IEEE Emerging Technologies Symposium: Broadband, Wireless Internet Access, Apr. 10, 2000.

International Application No. PCT/US2007/071383, International Search Report and Written Opinion mailed Mar. 19, 2008.

Decision re Institution of Inter Partes Review of U.S. Pat. No. 8,275,359 B2, United States Patent and Trademark Office, Patent Trial and Appeal Board, Case IPR2014-01165, Jan. 14, 2015.

Final Written Decision re Inter Partes Review of U.S. Pat. No. 8,275,359 B2, United States Patent and Trademark Office, Patent Trial and Appeal Board, Case IPR2014-01165, Oct. 30, 2015.

\* cited by examiner

WIRELESS USER BASED NOTIFICATION SYSTEM

CROSS-REFERENCE TO RELATED APPLICATIONS

This application is a continuation of application Ser. No. 13/918,819, filed Jun. 14, 2013, which is a continuation of application Ser. No. 13/593,436, filed Aug. 23, 2012 (U.S. Pat. No. 8,494,489, issued Jul. 23, 2013), which is a continuation of application Ser. No. 13/153,204, filed Jun. 3, 2011 (U.S. Pat. No. 8,275,359, issued Sep. 25, 2012), which is a continuation of application Ser. No. 11/764,071, filed Jun. 15, 2007 (U.S. Pat. No. 7,966,020, issued Jun. 21, 2011), which claims the benefit of provisional Application No. 60/814,254, filed Jun. 16, 2006, which are hereby incorporated by reference herein.

BACKGROUND OF THE INVENTION

The present invention relates to notification systems of the type used to inform a number of users of a communications network of an emergency or commercial opportunity, and more specifically, to a notification system for use in a wireless network that more efficiently uses network resources and infrastructure to provide location specific notifications.

There are many situations in which public safety or another public interest would benefit from notifying a number of people about an event or expected event. For example, a government entity may wish to notify all people living within some defined zone of an impending storm, a serious accident, or an activity that they need to be aware of. Further, a commercial entity may wish to inform a large number of people within a certain region of a commerce opportunity that may be of interest to them. Thus, the area of location specific notifications is one of interest to both public agencies and commercial businesses.

As mobile wireless phones and technology have become adopted and utilized by a large percentage of people, they have been recognized as a convenient and effective means for informing people of events or otherwise communicating with them. For example, in case of an emergency (criminal activity, weather event, serious accident, etc.), it would be beneficial to be able to notify all or a large percentage of mobile phone users within a prescribed geographic area of the event.

Although a wide scale broadcast to all mobile phone numbers currently within a specific area is theoretically possible, there are practical reasons that make it inefficient or otherwise undesirable to implement. For example, at present only a network cell level broadcast is available (that is sending a message to all recipients within a cell), and even then only for certain network topologies (e.g., GSM) and/or message delivery options (e.g., SMS messages). This approach may lack the resolution required for an effective system and produce unwanted or irrelevant messages to a large number of users. Furthermore, implementing this approach requires equipment upgrades for some carriers, and is not certain to be adopted by regulatory agencies.

A second approach to notification systems is one based on targeting the message to a specific set of users, as opposed to a broadcast to all users capable of receiving the message. In this approach, the set of recipients is determined based on a characteristic of a user other than their ability to receive a message broadcast within a cell site reception zone. For example, a system may be based on registration by a set of users interested in receiving a message regarding a certain event or topic. When an event of interest occurs, only those registered users are sent a message. This approach has the disadvantage that since it relies on a user to subscribe or register, not every user to whom the message is relevant will receive it. This has serious ramifications if, for example, the message being provided relates to an emergency situation or one in which all mobile phone users within a prescribed area need to be informed of a situation (e.g., an AMBER Alert or other such indicator of potentially dangerous or criminal activity). Similarly, if the registration process involves providing the user's residence or work location, the method cannot have any greater resolution than the data used to define that information. Furthermore, because each user is associated with a static location (e.g., a zip code, a neighborhood, an address, etc.), notifications regarding those locations would be sent regardless of where the user is actually located. The result may be a spamming effect in which a user receives a large number of notifications that go unread because most are deemed irrelevant.

Another method of providing a notification system involves the use of network probes. Using a network probe, a system can obtain user location information by passively monitoring network location traffic to a home location register (HLR) or between other network components. A disadvantage of such methods is that they require extensive use of network resources and increase the overall network traffic, thereby contributing to undesirable latency and network capacity issues. In addition, coordination of the various data sources and processing elements, and troubleshooting can be more than trivial problems. Furthermore, network probe methods introduce privacy issues as the subscribers are unaware of the tracking of their location and messaging behaviors.

The wireless industry plans to provide an SMS-based service that is similar to the Wireless AMBER Alert service. As this solution still has some disadvantages, it is not believed to be the optimal or long-term solution. For example, an SMS-based solution utilizing existing capabilities will suffer from disadvantages that include significant impact on network congestion when an alert is sent, potential latency in delivery of messages, and a limitation on what type and how much information can be provided. It is noted that an SMS-based service has an advantage over certain possible solutions being considered because it is a capability that can be enabled in networks such as global system for mobile communications (GSM), code division multiple access (CDMA), and integrated digital enhanced network (iDEN), and is available on a large number of phones in use.

In order to address concerns regarding the impact of an alert system on wireless networks, the wireless industry has proposed that three specific requirements be incorporated. First, that the system be opt-in based on a specified zip code as with Wireless AMBER Alerts. While this will require that consumers affirmatively request the service, it also may, depending on the number of consumers that subscribe, help to control impact on the network (while still potentially informing citizens that wish to be notified via wireless phone who otherwise may not be aware of an emergency). Combining this wireless service with alerts from other communications platforms may increase the likelihood of a successful consumer notification.

The second requirement is that the interim service should only transmit Presidential or Governor-level messages for the present time. Again, this will limit the impact on the wireless network so that during times of crises, the networks can be utilized by consumers, first responders, and those key government employees that rely upon Wireless Priority Service.

The third requirement is that government should commit to delivering messages to one point (e.g., network element or node) in the wireless network, as is the case with the existing Wireless AMBER Alert Program. It is hoped that by adopting these three requirements, government effectively will balance the desire to send emergency alerts over multiple communications platforms, including wireless, against the need to keep the wireless networks functioning efficiently during an emergency.

An effective notification or alert system offers many safety and commercial benefits. However, while the currently proposed solutions hold promise, none are operational in wireless networks today. In addition, the proposed solutions suffer from one or more significant disadvantages. Some of the solutions, as proposed, will require a complete reworking of networks, some only work on certain platforms (CDMA vs. GSM vs. iDEN), some are not scalable to a nationwide level, and many would require consumers to change-out their handsets.

BRIEF SUMMARY OF THE INVENTION

A group of wireless device users are notified of an event. A location data determination algorithm is provided to a wireless device, where the algorithm determines a frequency at which the device interacts with network elements to determine its location. The location data is stored in a notification server and identifies a user at a specific location. When a governmental or commercial entity wishes to issue a notification, a message is provided to those users whose location is identified as being in an area defined by the entity.

In some embodiments, a method notifies a group of wireless device users of an event. Each wireless device accesses a set of instructions that act to control a location updating process for the wireless device. Location data for the wireless device is obtained in accordance with the set of instructions. The location data is provided to a notification server. The location data is stored in a spatial database. The spatial database associates the location data with a geographic region.

A request is then received along with a description of a geographic area in which a notification message associated with the request is to be distributed. The geographic area comprises at least a portion of at least one geographic region. The description of the geographic area is mapped to the plurality of wireless devices using the location data stored in the spatial database. The mapping identifies the location of the wireless devices relative to the geographic area. At least one of the wireless devices is identified as being located within the geographic area. The notification message is issued to each wireless device identified as being located within the geographic area.

In some embodiments, a notification server is configured to receive a request and a description of a geographic area in which a notification message associated with the request is to be distributed. The geographic area includes at least a portion of at least one geographic region. The notification server compares the description of the geographic area to a plurality of mobile devices using location data associated with each mobile device. The comparison identifies the location of the mobile devices relative to the geographic area. At least one mobile device is identified as being located within the geographic area. The notification server issues the notification message to each mobile device identified as being located within the geographic area.

These and other advantages of the invention will be apparent to those of ordinary skill in the art by reference to the following detailed description and the accompanying drawings.

DETAILED DESCRIPTION OF THE INVENTION

Figure 1:
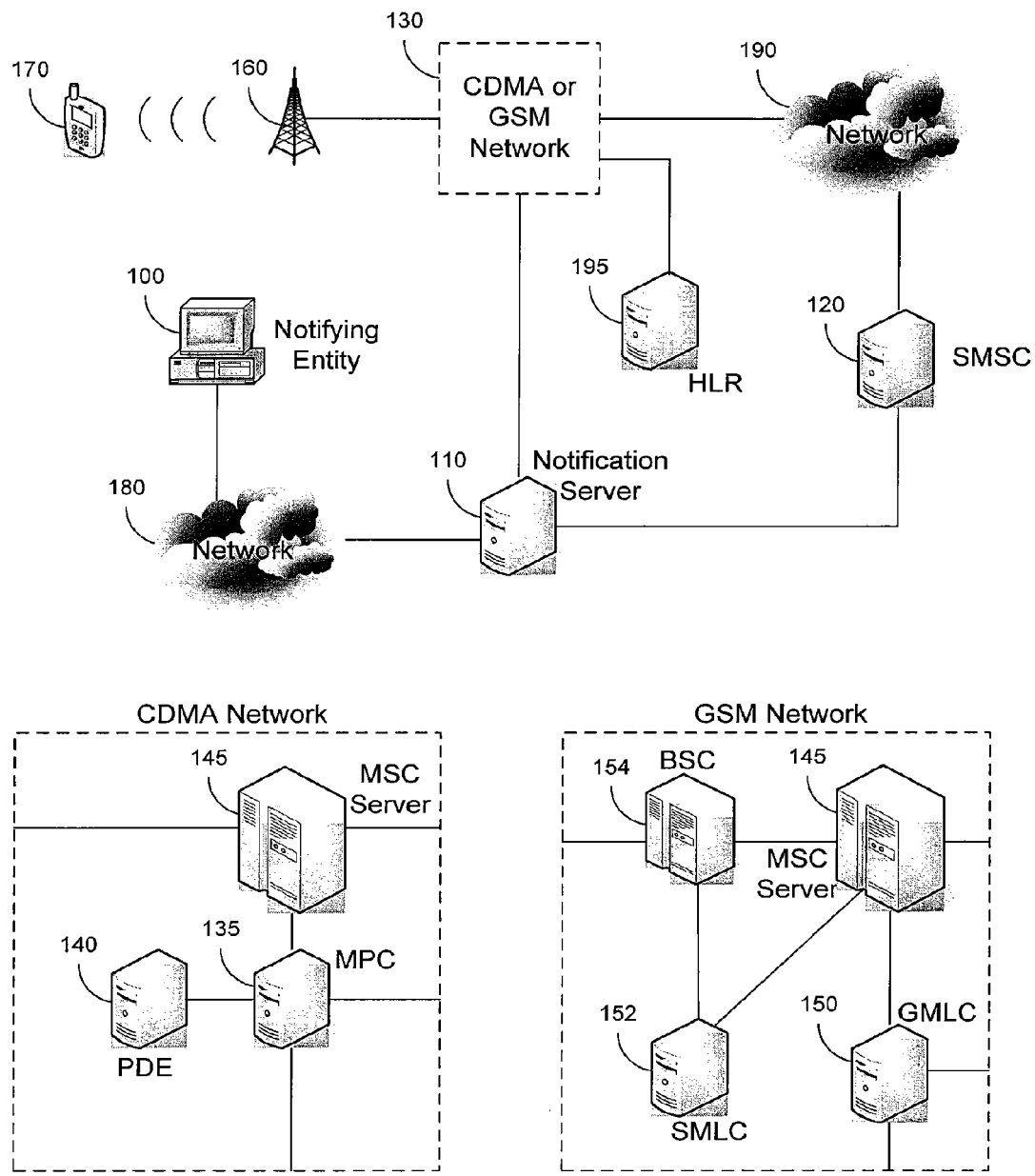
FIG. 1 is a functional block diagram of the components of an embodiment of the wireless user notification, system of the present invention suitable for implementation as part of a CDMA or a GSM network.

FIG. 1 is a functional block diagram of the components of an embodiment of the wireless user notification system of the present invention suitable for implementation as part of a CDMA or a GSM network. The wireless user notification system includes a notifying entity 100, a notification server 110, a short message service (SMS) center 120, a CDMA or GSM network 130, a communication tower 160, a mobile device 170 (e.g., wireless handset), and a home location register (HLR) 195. The CDMA network includes a mobile positioning center 135, a position determining entity 140 and a mobile switching center (MSC) server 145. The GSM network includes an MSC server 145 (similar to the one used in the CDMA network), a gateway mobile location center (GMLC) 150, a serving mobile location center (SMLC) 152, and a base station controller (BSC) 154.

The notifying entity 100 is any client that seeks to send a notification message to a group of mobile devices. For example, the notifying entity 100 could be an emergency alert system (EAS), or any governmental or commercial entity. The notifying entity 100 is coupled to the notification server 110 via a network 180 (e.g., the Internet). The SMS center is coupled to the notification server 110, and is also coupled to the MSC server 150 via a network 190 (e.g., a Signaling System #7 Network). The CDMA or a GSM network 130 communicates with the mobile device 170 via the communication tower 160.

In the CDMA network, the mobile positioning center 135 is coupled to the notification server 110, the positioning determining entity 140, the MSC server 145 and the LR 195, and the MSC server is coupled to the communication tower 160. In the GSM network, the MSC server 145 is coupled to the GMLC 150, the SMLC 152 and the base station controller 154. The base station controller 260 is coupled to the SMLC 152 and the communication tower 160. The GMLC 150 is coupled to the notification server 110 and the HLR 195.

The call flow in the CDMA or GSM network is described as follows. The mobile device 170 executes an application to register the mobile device 170 with the notification server 110. Upon registration, the mobile device 170 performs a location fix and provides its location information to the notification server 110. The notification server 110 downloads an algorithm to the mobile device 170 to indicate how often the mobile device 170 is to perform subsequent location fixes. The algorithm also instructs the mobile device 170 which location determining method to execute in order to obtain or trigger the location fix. The mobile device 170 initiates a location fix using the pre-programmed algorithm. The mobile device periodically performs a location fix such that the notification server 110 maintains current information about the approximate location of the mobile device 170. Thus, a notification message can be sent to the mobile device 170 using the best delivery method available when a notification alert is issued. In some embodiments, the notification server 110 may dictate the quality of service (QOS) for the location fix. For example, the location fix may identify the approximate location of the mobile device within 200 meters.

The purpose of the algorithm is to distribute the location fixes in a geographic area so as to ensure that there is minimal (or at least non-detrimental) impact to the network infrastructure. The algorithm is stored on the mobile device 170, but may be updated via over-the-air provisioning protocols, messaging (e.g., SMS), or other known methods. For example, the notification server 110 may update the algorithm in response to the occurrence of a new event. The algorithm may be updated manually or automatically. The notification server 110 may automatically update the algorithm using scripts stored in the notification server 110. The scripts are associated with certain events such that a key word associated with an event in a notification request would trigger execution of the corresponding script. Furthermore, multiple algorithms may be stored on the mobile device 170 such that the mobile device 170 is configured to report its location based on multiple scenarios with a different reporting schedule for each scenario. In some embodiments, the algorithm allows a carrier to notify users based on non-geographic criteria (e.g., user characteristics or a user profile). These characteristics or profile data may be stored in the notification server 110.

The notification server 110 receives the mobile device location update either via the MPC 135 (in the CDMA network), the GMLC 150 (in the GSM network), or the SMS center 120 (or some other suitable messaging mode). The notification server 110 then stores the mobile device location data in a spatial database. Thus, the notification server 110 is continually updated regarding the location of the mobile device 170.

The notifying entity 100 sends a notification request to the notification server 110. The notifying entity 100 may send the notification request in response to an occurrence of an event of which users are to be notified (e.g., a fire, a chemical spill, a hostage situation, etc.). The notifying entity 100 identifies the area in which users are to be notified (i.e., the notification area). In some embodiments, the notifying entity 100 generates a polygon which defines the geographic boundary of the notification area. For example, the notification request may be a shape file (e.g., an Arch View Shape file, or another representation of a boundary shape that defines the region inside which users are to be notified). The notification request may also include the content of the notification and an urgency level of the notification request (e.g., high for an emergency, low for a commercial activity, medium for weather update, etc.). In some embodiments, the notification request is a common alerting protocol (CAP) message that allows a warning message to be consistently disseminated simultaneously over many warning systems to many applications.

The notification server 110 processes the notification request by matching the mobile device location information in the spatial database to the notification area described in the notification request. In other words, the notification server 110 identifies which mobile devices are registered in the notification area. The identified mobile devices are some of the mobile devices that may require a notification message to be sent.

The notification server 110 determines, based on the content of the notification request, the method by which the mobile devices are to be sent the notification message. In the simplest case, the notification server 110 may determine that notification messages are to be sent to all of the mobile devices registered with the notification server 110 regardless of current location. However, this method may overwhelm the network because too many users are sent a notification message simultaneously. Usually, the notification server 110 is required to perform some type of location determination. The types of location determination may be categorized as a low accuracy resolution or a high accuracy resolution.

Low accuracy resolution location determination is performed based on the contents of the notification request. The notification server 110 queries the home location register 195 through the MPC 135 or the GMLC 150 to identify the mobile devices associated with MSCs that serve geographic regions that that overlap the notification area. The notification server 110 then receives a list of cell identifiers of the mobile devices registered with the MSCs that serve the notification area. The notification server 110 then sends notification messages to the mobile devices corresponding to the cell identifiers in the list. Thus, notification messages are sent to the mobile devices in the notification area and to the mobile devices outside of the notification area but within a region served by an MSC that also overlaps the notification area.

High accuracy resolution location determination is performed in a way that is similar to the low accuracy resolution location determination. As described above, the notification server 110 receives the list of cell identifiers of the mobile devices that are currently registered in the MSC regions that overlap the notification area. The notification server 110 matches the location of the mobile devices in the MSC regions that overlap the notification area to the polygon that defines the boundaries of the notification area. Thus, the mobile devices within the notification area are identified. In some embodiments, the notification area is defined with a buffer area surrounding the polygon. For example, the buffer area may extend up to 40% beyond the perimeter of the polygon to compensate for any inaccuracies in the location determination process. In this case, the high accuracy resolution locates the mobile devices in the notification area and the mobile devices in the buffer area. The notification server 110 then sends notification messages to the mobile devices located by the high accuracy resolution. Thus, notification messages are sent to the mobile devices in the notification area and to the mobile devices in the buffer area.

In the high accuracy resolution, there are fewer mobile devices to locate compared to the low accuracy resolution. As a result, fewer cycles of SMS messaging are required in the high accuracy resolution case. This feature can prove beneficial in a major catastrophe when the phone system is overwhelmed. If a mass SMS message is sent to every mobile device located in a large geographic area (e.g., a zip code), the network may not be able to handle the increased traffic. By targeting a limited number of mobile devices located in a small area using high accuracy resolution, the strain exerted on the network is minimized.

Figure 2:
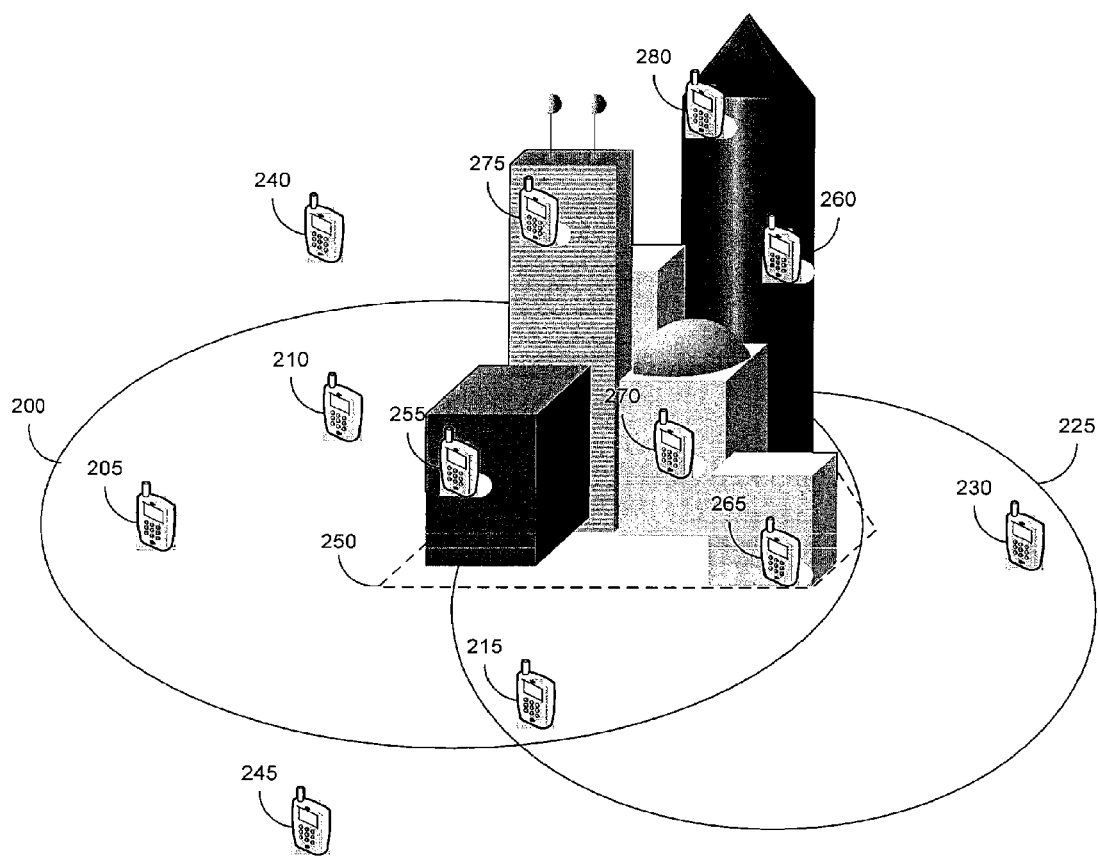
FIG. 2 is a geographic illustration that shows the distribution of mobile devices across an area in cell sectors and a notification area identified by a notifying entity.

FIG. 2 is a geographic illustration that shows the distribution of mobile devices across an area (e.g., a city neighborhood) in regions served by an MSC (i.e., a cell sector) and a notification area identified by a notifying entity. Cell sectors 200, 225 each define an area in which a number of mobile devices (205, 210, 215, 230 and 255-280) are registered with an MSC serving that cell sector. A notification area 250 defines an area which includes a subset of the mobile devices in the cell sectors 200, 225. In some embodiments, the notification area 250 is a polygon defined by the notifying entity. As shown in the figure, the notification area 250 includes mobile devices 255-280.

In accordance with some embodiments of the present invention, a determination is made to send a notification message to all of the mobile devices in a large area (e.g., in the same zip code). For example, the notification server 110 determines whether to send the notification message to mobile devices 205-245 and 255-280. Alternatively, the notification server 110 determines whether to send notification messages to only the mobile devices registered in cell sectors 200, 225 (i.e., low accuracy resolution), or to send a notification message to only the mobile devices located in the notification area 250 (i.e., high accuracy resolution). The determination may be made based on the type of notification request sent by the notifying agency 100 and/or depending on how the carrier has configured the system to respond to the notification request. Low accuracy resolution is used when all of the mobile devices in the cell sectors 200, 225 are to be sent a notification message but the mobile devices outside of the cell sectors 220, 225 are not to be sent notification messages. High accuracy resolution is used when the cell sectors 200, 225 are deemed too large and all of the mobile devices in the cell sectors 200, 225 need not be sent the notification message. In other words, only the mobile devices located in the notification area 250 are to be sent notification messages.

The notification server 110 initiates the high accuracy resolution location of the mobile devices in the notification area 250. The mobile devices in the notification area 250 periodically provide the notification server 110 with their corresponding location. In some embodiments, the notification server 110 controls the pace at which the mobile devices are located so as to not overwhelm the network. The notification server 110 then generates messages (e.g., via SMS or another known text messaging method) for delivery to the mobile devices 255-280 that are located in the notification area 250.

The notification server 110 is easily configurable such that a carrier may select how the notification messages are sent and how the network is arranged to distribute the notification messages. The notification server 110 is designed to authenticate that the notification request is submitted by a lawfully authorized entity such that privacy protections are maintained. In some embodiments, the mobile devices include optional user controls to prevent disclosure of their location (i.e., a privacy mode). In addition, the user can activate or deactivate the mobile device to identify its current location as understood by the network infrastructure or remain private. This is one way of indicating to the user that their location is known to elements of the emergency notification network. Other configurable features of the notification server 110 are described below.

In some embodiments, the notification messages to be sent to the mobile devices 255-280 in the notification area 250 are placed in a queue in the notification server 110. If the queue is not filled with notification messages, the messages are streamed to the mobile devices 255-280. If the queue is filled with notification messages, the notification server 110 stores the messages to be sent until the messages in the queue are sent and the stored messages can be transferred to the queue for delivery. The number of messages that can be stored in the queue may be configured by the carrier.

In some embodiments, some mobile devices are flagged in the notification server 110 to receive a notification message regardless of mobile device location. For example, when the identifying information of that mobile device appears at the notification server 110 (e.g., because the mobile device is in the cell sector 200), the notification message will always be sent to that mobile device even though the mobile device may not be located in the notification area 250. This feature is useful to users that have a heightened interest in events occurring in the notification area 250 (e.g., emergency personnel, building security, government employees, royalty, etc.). In some embodiments, the notification server 110 may be configured to send the notification messages in a hierarchical manner such that mobile devices associated with users who have a heightened interest in events occurring in the notification area 260 receive the notification messages before other users (i.e., notification messages to be sent to these users are placed at the front of the message queue).

In general, the mobile devices in the notification area 250 are provided with a notification message to notify users of the event, whereas mobile devices outside the notification area 250 are not sent notification messages. In some embodiments, however, the mobile devices located outside of, but nearby, the notification area 250 (e.g., in a cell sector that overlaps the notification area 250) are sent messages that are different than the notification messages sent to the mobile devices within the notification area 250. For example, in a hostage crisis, the mobile devices located within the notification area may be sent a message that reads, "Exit the Acme Building from the north side." The mobile devices located proximate to but outside of the notification area may be sent a message that reads, "Do not enter the Acme Building or the two-block area surrounding the Acme Building." Messages sent to the mobile devices in the notification area can instruct users to assist law enforcement. For example, a notification message might read, "If you are in the Acme Building and can safely take a photograph of any alleged perpetrators with this mobile device, forward the photograph to (123)555-1234." Furthermore, law enforcement could use high accuracy location determination to identify the mobile devices within a given area. For example, law enforcement can identify which users are in a building. The periodic location updates would also allow law enforcement to detect the movement of those users. This feature is helpful for compliance with policies of the commission on accreditation for law enforcement agencies (CALEA).

The notification server 110 is capable of alerting potential recipients in a staggered method to reduce network impact. The notification server 110 typically bases the staggered method on the size of the notification area and the number of users relative to network capacity or operating characteristics (e.g., load balancing). For example, a staggered delivery algorithm would generate notification messages in a notification area at a frequency and rate based on the size of the notification area and the number of users to be notified. A large notification area (e.g., an entire city) requires tighter control on messages per second while a small notification area (e.g., a city block, a rural area) may allow a notification message to be sent to all mobile devices in the notification area at the same time.

Figure 3:
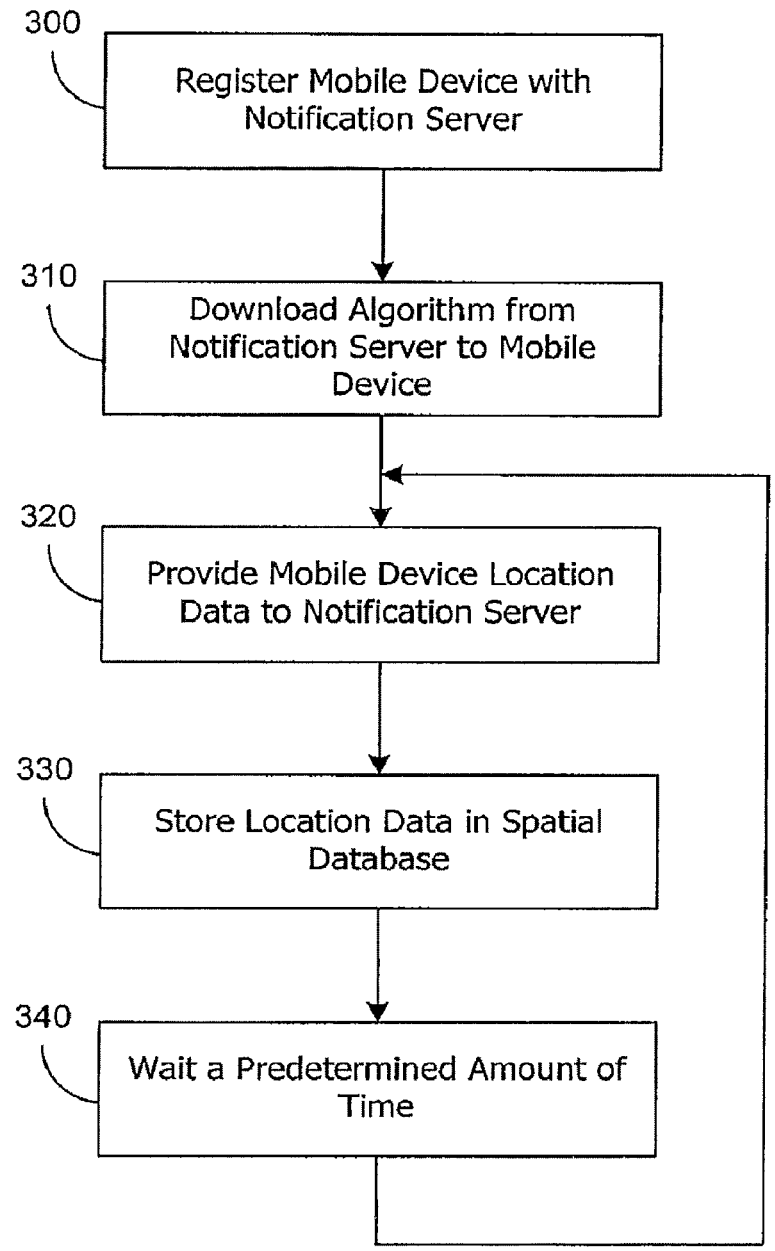
FIG. 3 is a flow diagram illustrating a method for providing mobile device location information to a notification server.

FIG. 3 is a flow diagram illustrating a method for providing mobile device location information to a notification server. At step 300, the mobile device registers with the notification server by executing an application stored on the mobile device. The mobile device also provides its location to the notification server.

At step 310, the notification server downloads an algorithm to the mobile device. The algorithm instructs the mobile device to provide location updates to the notification server. The algorithm indicates how often the location updates are provided to the notification server.

At step 320, the mobile device executes the algorithm to determine its location by a location determination method indicated in the algorithm and provides the corresponding location data to the notification server. At step 330, the notification server stores the location data and information about the corresponding mobile device in a spatial database.

At step 340, after a predetermined amount of time, processing returns to step 320 where the mobile device provides a location update to the notification server. In some embodiments, the predetermined amount of time is configured by the carrier. In some embodiments, the predetermined amount of time may be set at a static duration (e.g., every two hours). In other embodiments, the predetermined amount of time may be dynamic (e.g., every time the mobile device enters a region served by a different MSC). As is apparent from the above description, the mobile device periodically provides location updates to the notification server. Thus, the notification server maintains current location information for the mobile device.

Figure 4:
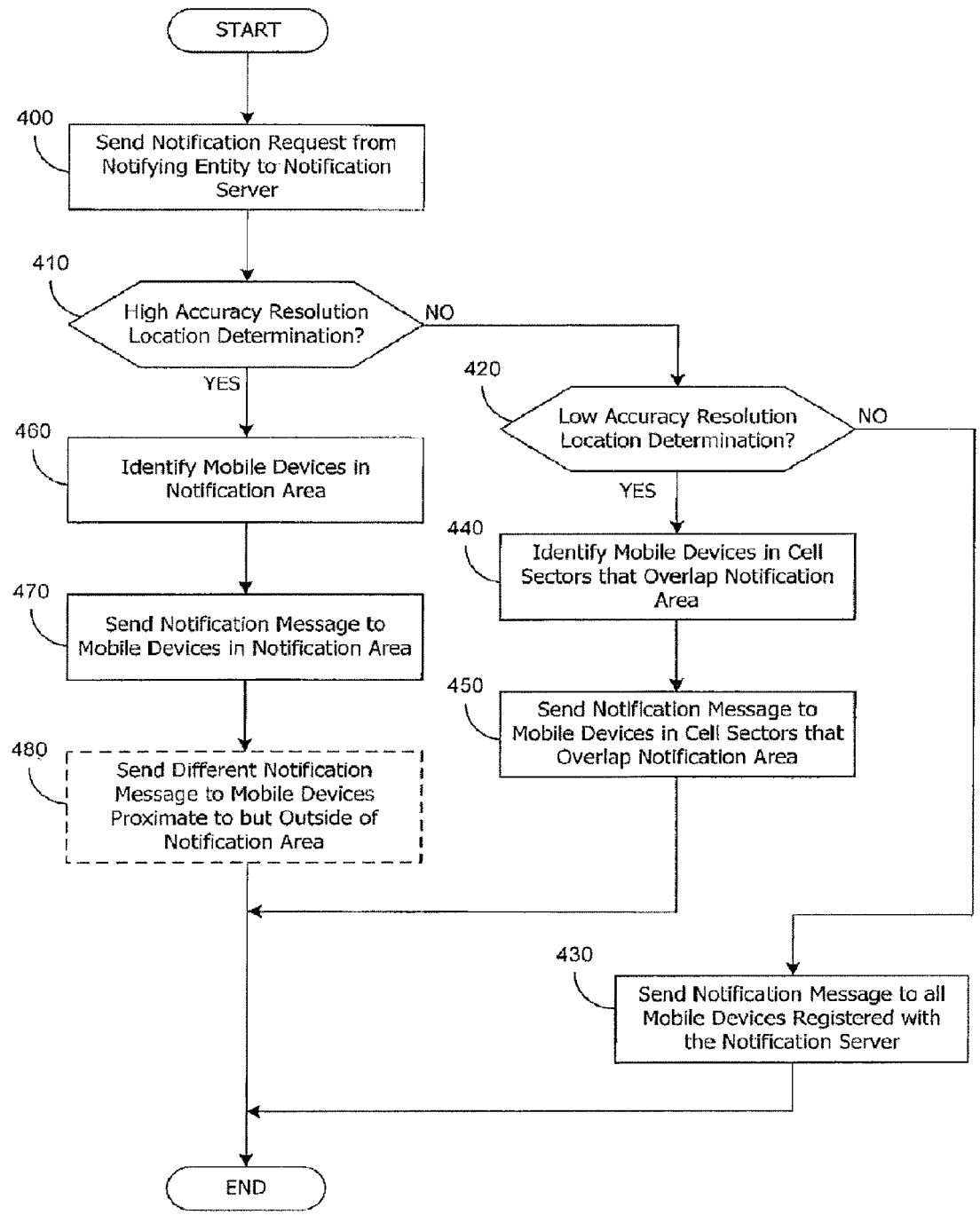
FIG. 4 is a flow diagram illustrating a method for sending notification messages to users of a wireless system.

FIG. 4 is a flow diagram illustrating a method for sending notification messages to users of a wireless system. At step 400, the notifying entity sends a notification request to the notification server. The notifying entity is any lawfully authorized client that seeks to send a notification message to a group of mobile devices. The notifying entity may send a notification request in response to an event of which users are to be notified. In some embodiments, the notification request is a CAP message that allows a warning message to be consistently disseminated simultaneously over many warning systems to many applications. The notification request may include the content of the notification, a definition of the notification area, and an urgency level of the notification request. The definition of the notification area may be a polygon which defines the geographic boundary of the notification area.

At step 410, a determination is made whether the location of the mobile devices to be sent the notification message is to be made with high accuracy resolution. The location determination method to be performed may be predetermined by the algorithm. The carrier or the notifying entity may provide instructions regarding the configuration of the algorithm such that the algorithm can be updated to accommodate different situations. If the location of the mobile devices to be sent the notification message is to be made with high accuracy resolution, processing proceeds to step 460. Otherwise, processing proceeds to step 420.

At step 420, a determination is made whether the location of the mobile devices to be sent the notification message is to be made with low accuracy resolution. If the location of the mobile devices to be sent the notification message is to be made with low accuracy resolution, processing proceeds to step 440. Otherwise, processing proceeds to step 430, where the notification message is sent to all of the mobile devices currently registered with the notification server. Thus, the notification message is widely disseminated to a potentially large number of mobile devices located across a potentially large geographic area.

At step 440, in accordance with low accuracy resolution determination, the notification server identifies the mobile devices that are located in cell sectors served by MSCs that overlap the notification area. The notification server determines the current location of the mobile devices by accessing the spatial database. The notification server then maps those locations to the definition of the notification area. Any mobile devices that are currently located in cell sectors that overlap the notification area are identified to receive a notification message.

At step 450, the notification server sends a notification message to the mobile devices that are located in the cell sectors that overlap the notification area. Thus, the notification message is sent to the mobile devices in the notification area and to mobile devices served by the same MSCs as the mobile devices in the notification area.

At step 460, in accordance with high accuracy resolution determination, the notification server identifies the mobile devices that are located in the notification area by mapping the mobile device locations in the spatial database to the definition of the notification area in the notification request. In some embodiments, the notification area is defined with a buffer area. For example, the buffer area may extend up to 40% beyond the perimeter of the notification area. Thus, mobile devices are located in the notification area and the buffer area.

At step 470, the notification server sends a notification message to the mobile devices that are located in the notification area. In some embodiments, the notification message is also sent to the mobile devices in the buffer area.

At optional step 480, the notification server sends a different notification message to the mobile devices that are located proximate to but outside of the notification area. The mobile devices proximate to the notification area may be located in a cell sector that overlaps the notification area or in the buffer area. The different notification message sent to these mobile devices may describe the event occurring in the notification area as a warning to not enter the notification area. Processing then terminates.

Figure 5:
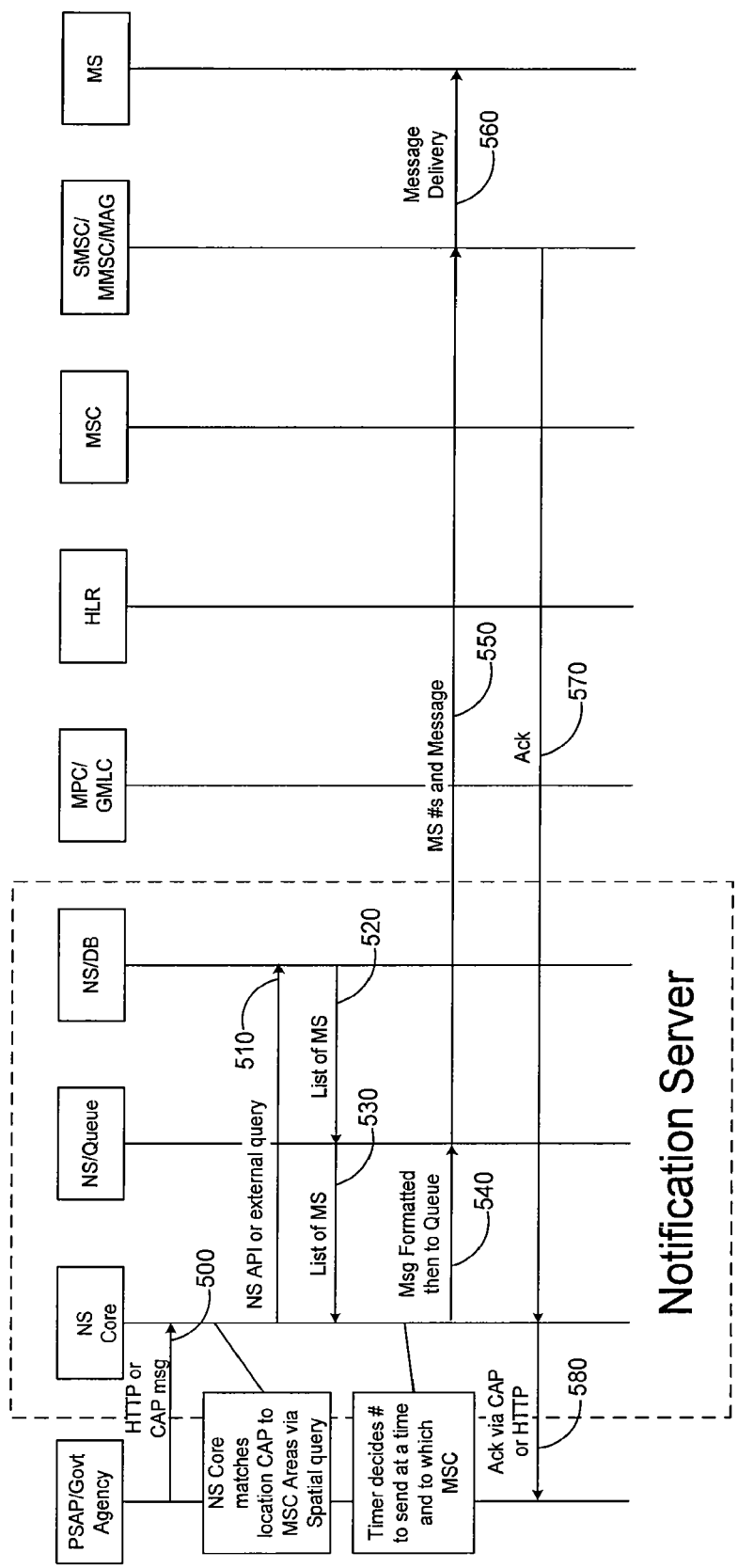
FIG. 5 is a signal call chart illustrating a method for sending notification messages to users of a wireless system in accordance with a notification server configured to determine mobile device location in accordance with a basic resolution.

FIG. 5 is a signal call chart illustrating a method for sending notification messages to users of a wireless system in accordance with a notification server configured to determine mobile device location in accordance with a basic resolution. A public safety answering point (PSAP) or government agency sets up a connection with the notification server and then sends a CAP message (500). The notification server core receives the CAP message and matches a notification area (e.g., a polygon) identified in the CAP message to MSC areas via a spatial query to a database (510). The database may be included within the notification server, or may be an external database coupled to the notification server. The database returns a list of mobile subscribers that are or have been registered in the MSC areas serving the notification area to a message queue (520) and to the notification server core (530). A timer decides the number of messages to send at a time, and the MSCs to which the messages are sent. Based on the location information in the CAP message, the notification server core identifies which MSCs are in that location such that notification messages can be sent to the mobile devices in those MSCs. The notification messages are formatted and put into a queue (540). The queue sends the list of mobile devices and the notification messages to be sent to a message delivery system (e.g., SMSC, MMSC, MAG, etc.) (550). The message delivery system then delivers the notification messages to the mobile devices (560). Successful delivery of the notification messages is acknowledged to the notification server core (570) and the PSAP (580).

Figure 6:
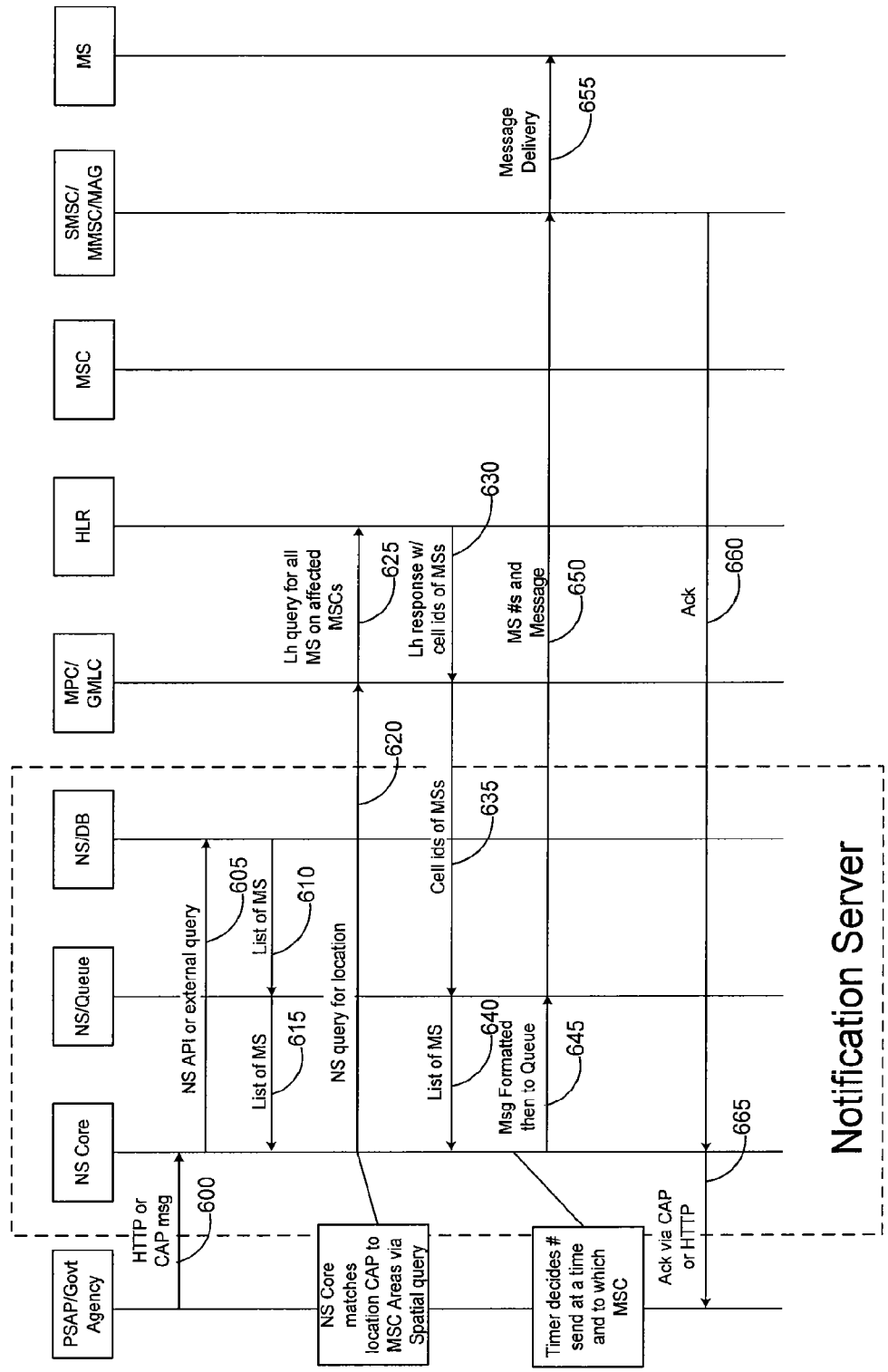
FIG. 6 is a signal call chart illustrating a method for sending notification messages to users of a wireless system in accordance with a notification server configured to determine mobile device location in accordance with a low accuracy resolution.

FIG. 6 is a signal call chart illustrating a method for sending notification messages to users of a wireless system in accordance with a notification server configured to determine mobile device location in accordance with a low accuracy resolution. A PSAP sends a CAP message to the notification server (600). The CAP message identifies a notification area. The notification server core receives the CAP message. The notification server core matches a location identified in the CAP message to MSC areas via a spatial query to a database (605). The database returns a list of mobile subscribers that are or have been registered in the MSC areas serving the notification area to a message queue (610) and to the notification server core (615). The notification server core also queries a GMLC (in a GSM network) or an MPC (in a CDMA network) for a location using the notification area from the CAP message (620). The GMLC or the MPC queries an HLR through an Lh interface to identify the mobile devices located in the MSCs that serve the notification area (625). The HLR responds to the GMLC/MPC with identifiers for the mobile devices (i.e., cell IDs) registered with the MSCs that server the notification area (630). The cell IDs are then provided to the queue (635). A list of mobile devices corresponding to the cell IDs are provided to the notification server core to identify the mobile devices in the notification area (640). A timer decides the number of messages to send at a time, and the MSC to which the messages are sent. The notification messages are formatted and put into the queue (645). The queue sends the list of the mobile devices and the notification messages to be sent to the message delivery system (650). The message delivery system then delivers the notification messages to the mobile devices (655). Successful delivery of the notification messages is acknowledged to the notification server core (660) and the PSAP (665).

Figure 7:
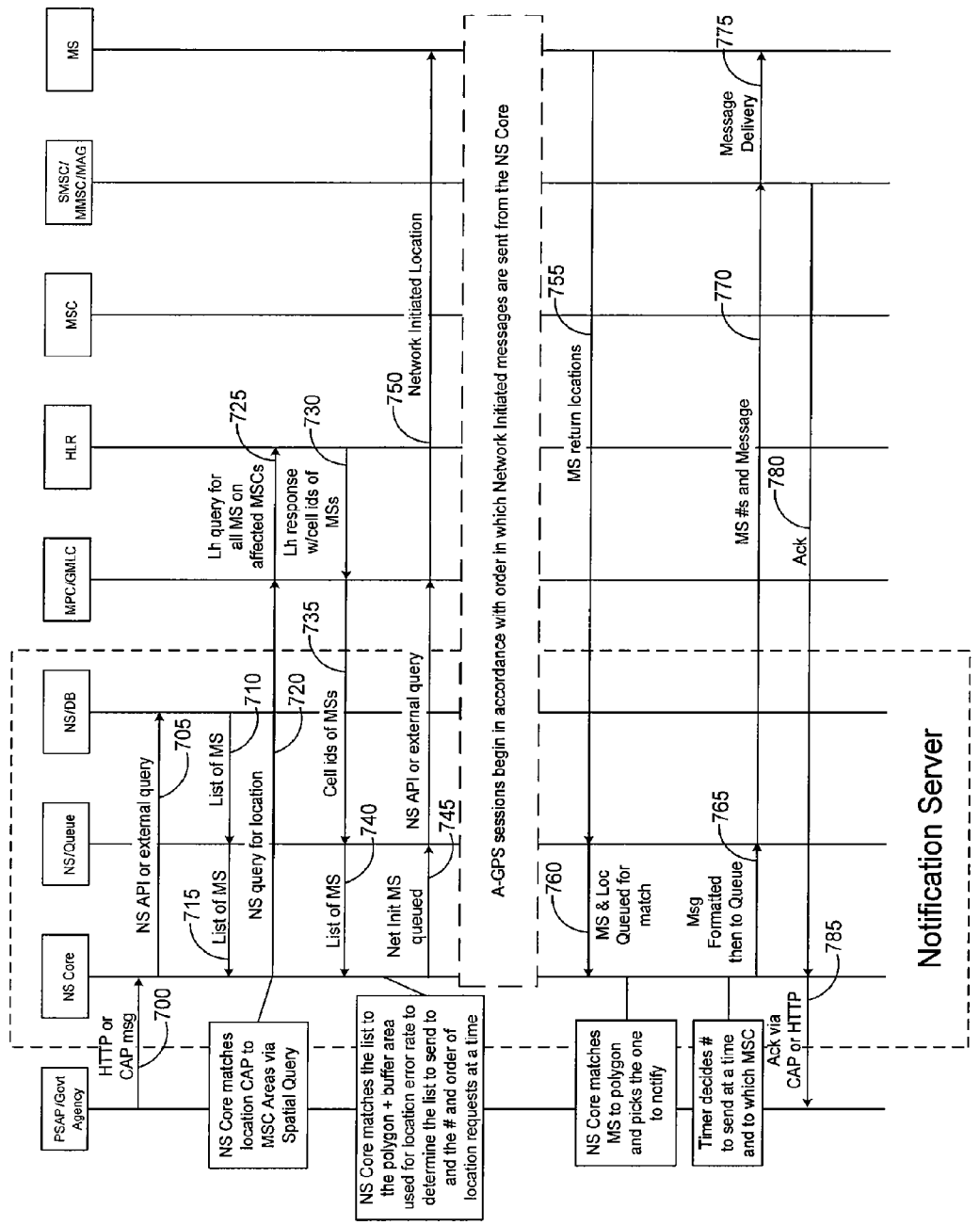
FIG. 7 is a signal call chart illustrating a method for sending notification messages to users of a wireless system in accordance with a notification server configured to determine mobile device location in accordance with a high accuracy resolution.

FIG. 7 is a signal call chart illustrating a method for sending notification messages to users of a wireless system in accordance with a notification server configured to determine mobile device location in accordance with a high accuracy resolution. A PSAP sends a CAP message to the notification server (700). The CAP message identifies a notification area. The notification server core receives the CAP message. The notification server core matches a location identified in the CAP message to MSC areas via a spatial query to a database (705). The database returns a list of mobile subscribers that are or have been registered with the MSCs that serve the notification area to a message queue (710) and to the notification server core (715). The notification server core also queries the GMLC/MPC for a location using the notification area from the CAP message (720). The GMLC/MPC queries the HLR through an Lh interface to identify the mobile devices currently registered with the MSCs that serve the notification area (725). The HLR responds to the GMLC/MPC with cell IDs of the mobile devices registered with the MSCs that serve the notification area (730). The cell IDs are then provided to the queue (735). The list of mobile devices corresponding to the cell IDs are provided to the notification server core to identify the mobile devices located in the notification area (740).

The notification server core matches the list of the mobile devices to the notification area (e.g., the polygon) and, in some cases, a buffer area used for a location error rate to determine the list of mobile devices to send notification messages, and the number and order of location requests to be performed at a time. Thus, the notification server core decides a possible range of mobile devices to notify and the number of mobile devices to notify at a time. This information is provided to the queue (745). The queue then begins sending the location requests to the GMLC/MPC (745) and to each identified mobile device (750). An assisted GPS session begins in accordance with regular network initiated location standards. The mobile devices return their location to the queue (755). The queue provides the locations to notification server core (760). The queue manages the incoming data so as to not overload the network. The notification server core matches the mobile devices to the polygon and identifies the mobile devices to notify.

The timer decides the number of messages to send at a time, and the MSC to which the messages are sent. The notification messages are formatted and put into the queue (765). The queue sends the list of the mobile devices and the notification messages to be sent to the message delivery system (770). The message delivery system then delivers the notification messages to the mobile devices (775). Successful delivery of the notification messages is acknowledged to the notification server core (780) and the PSAP (785).

As is apparent from the above description, in the high accuracy resolution, there are fewer mobile devices to locate compared to the low accuracy resolution. As a result, fewer cycles of SMS messaging are required in the high accuracy resolution case. This feature can prove beneficial in a major catastrophe when the phone system is overwhelmed. If a mass SMS message is sent to every mobile device located in a large geographic area (e.g., a zip code), the network may not be able to handle the increased traffic. By targeting a limited number of mobile devices located in a small area using high accuracy resolution, the strain exerted on the network is minimized.

The present invention has been described in terms of specific embodiments. As will be understood by those skilled in the art, the embodiments illustrated above may be modified, altered, and changed without departing from the scope of the present invention. The scope of the present invention is defined by the appended claims.

The invention claimed is:

1. A server system comprising:
an interface configured to receive a request from an application on a wireless device via a wireless communications network;
memory storing computer-readable instructions defining an algorithm executable by the wireless device to cause the wireless device to transmit location updates over the wireless communications network, the algorithm when executed by the wireless device being configured to dynamically vary respective time intervals between respective location updates to dynamically control when each of the location updates is to be transmitted by the wireless device; and
at least one processor configured to cause the computer-readable instructions to be downloaded to the wireless device over the wireless communications network in response to the request.

2. The server system of claim 1, wherein the memory stores an update, and the at least one processor is further configured to cause the update to be downloaded to the wireless device over the wireless communications network, the update comprising computer-readable instructions defining an updated algorithm executable by the wireless device to cause the wireless device to transmit location updates via the wireless communications network according to the updated algorithm.

3. The server system of claim 2, wherein the at least one processor is configured to cause the update to be downloaded to the wireless device using an over-the-air provisioning protocol.

4. The server system of claim 1, wherein the computer-readable instructions defining the algorithm specify at least one location-determining method to determine a current location of the wireless device.

5. The server system of claim 4, wherein the computer-readable instructions defining the algorithm specify to use a global positioning system (GPS) as the at least one location-determining method responsive to a requirement for high accuracy.

6. The server system of claim 1, wherein the computer-readable instructions defining the algorithm are configured to dynamically vary respective time intervals between respective location updates based at least in part on at least two different scenarios.

7. The server system of claim 1, wherein the at least one processor is further configured to conduct a registration process in relation to the wireless device prior to allowing the computer-readable instructions to be downloaded to the wireless device.

8. A wireless device, comprising:
   memory storing an application configured to transmit a request to a server system;
   at least one processor configured to execute the application to cause the request to be transmitted to the server system over a first wireless communications network; and
   an interface configured to receive, in response to the request, a download of computer-readable instructions defining an algorithm executable by the at least one processor of the wireless device, the algorithm being configured to cause the wireless device to transmit location updates indicative of locations of the wireless device over a second wireless communications network when location updating is active on the wireless device, the algorithm being further configured to dynamically vary respective time intervals between respective location updates to dynamically control when each of the location updates is to be transmitted.

9. The wireless device of claim 8, wherein the at least one processor is further configured to:
   receive a notification message over a third wireless communications network, the notification message being based at least on a most recent location update of the location updates; and
   provide a user notification to a user of the wireless device based at least in part on the notification message.

10. The wireless device of claim 9, wherein the notification message is further based at least in part on a user profile associated with the user of the wireless device.

11. The wireless device of claim 10, wherein the at least one processor is further configured to receive a further notification message from the server system, the further notification message being based at least in part on the user profile and on a geographic area different from a most recent location indicated by a most recent location update.

12. The wireless device of claim 9, wherein the at least one processor is further configured to provide the user notification to the user by displaying at least part of the notification message on a display of the wireless device.

13. The wireless device of claim 9, wherein the notification message is further based at least in part on a proximity of a most recent location indicated by a most recent location update to a location of an event.

14. The wireless device of claim 9, wherein the third wireless communications network is the same as the second wireless communications network.

15. The wireless device of claim 8, wherein the algorithm specifies at least one location-determining method to determine a current location of the wireless device.

16. The wireless device of claim 15, wherein the algorithm specifies to use a global positioning system (GPS) as the at least one location-determining method responsive to a requirement for high accuracy.

17. The wireless device of claim 8, wherein the at least one processor is further configured to provide user controls on the wireless device to activate the location updating.

18. The wireless device of claim 8, wherein the at least one processor is further configured to provide user controls on the wireless device to deactivate the location updating.

19. The wireless device of claim 8, wherein the algorithm is further configured to dynamically vary respective time intervals between respective location updates based at least in part on at least two different scenarios.

20. The wireless device of claim 8, wherein the first wireless communications network is the same as the second wireless communications network.

21. The wireless device of claim 8, wherein the at least one processor is further configured to execute the application to conduct a registration process with the server system prior to receiving access to the download of the computer-readable instructions.

* * * * *